United States Patent [19]

Ito et al.

[11] Patent Number: 5,367,398
[45] Date of Patent: Nov. 22, 1994

[54] OPTICAL ATMOSPHERIC LINK SYSTEM

[75] Inventors: Yujiro Ito; Kohji Suzuki; Takashi Otobe, all of Kanagawa, Japan

[73] Assignee: Sony Corporation, Tokyo, Japan

[21] Appl. No.: 43,734

[22] Filed: Apr. 7, 1993

[30] Foreign Application Priority Data

Apr. 11, 1992 [JP] Japan .................. 4-117945

[51] Int. Cl.$^5$ .......................................... H04B 10/00
[52] U.S. Cl. .................. 359/154; 359/159; 359/168
[58] Field of Search ............... 359/154, 159, 168–170, 359/172

[56] References Cited

U.S. PATENT DOCUMENTS

| 4,879,764 | 11/1989 | Walter | 359/159 |
| 4,882,772 | 11/1989 | Rist et al. | 359/159 |
| 5,060,304 | 10/1991 | Solinsky | 359/159 |
| 5,065,455 | 11/1991 | Ito et al. | 359/159 |

FOREIGN PATENT DOCUMENTS

| 0206668 | 12/1986 | European Pat. Off. | |
| 0095741 | 6/1984 | Japan | 359/159 |
| 0162848 | 6/1990 | Japan | 359/159 |
| 2218874 | 11/1989 | United Kingdom | |

Primary Examiner—Richard E. Chilcot, Jr.
Assistant Examiner—Kinfe-Michael Negash
Attorney, Agent, or Firm—William S. Frommer; Alvin Sinderbrand

[57] ABSTRACT

An optical atmospheric link system controls the angle an emitted light beam makes to a predetermined direction. A turning force is supplied to a rigid body housing an optical system without direct contact with the rigid body so that changes in the optical axis caused by a disturbance can be compressed, allowing servo-control operation to adjust the optical axis with high speed and with less driving power.

8 Claims, 6 Drawing Sheets

OPTICAL ATMOSPHERIC LINK SYSTEM

FIELD OF THE INVENTION

This invention relates to an optical atmospheric link system, and is particularly suitable for an optical atmospheric link system for transmitting desired data by transmitting a light beam through space.

BACKGROUND OF THE INVENTION

Heretofore, regarding this type of optical atmospheric link system, a system which can transmit data to and receive data from a remote target receiving/transmitting system by a light beam transmitted through space has been proposed (cf. Japanese Patent Application Lied Open No. 305734/1989).

As shown in FIG. 1, in the optical atmospheric link system, a laser diode LD is driven by a predetermined data signal and a light beam LA1 of a predetermined polarization plane is emitted from the laser diode LD.

A lens L1 collimates the light beam LA1 to a parallel luminous ray, which passes through polarization beam splitter 7, and via lenses L2 and L3 so as to be sent to the remote target system to be transmitted.

In this way, the optical atmospheric link system 1 delivers the light beam LA1 of a predetermined polarization plane to the remote target system to be transmitted.

The lens L3 receives the light beam arriving from the object of transmission, and then directs it to the polarization beam splitter 7 via the lens L2.

In the remote target system, a light beam LA2, which is orthogonal in the polarization plane to the light beam LA1, is transmitted to the optical atmospheric link system 1.

Hence, in the optical atmospheric link system 1, the light beam LA2 is reflected by the polarization splitter 7, and then condensed through a half mirror 8 and lens L4 to a light receiving element PD.

In this way, in the optical atmospheric link system 1, the light beam LA2 arriving from the remote target system is received so that the data can be received.

The light beam LA2 which arrives at the half mirror 8 is refracted through lens L5 to an incident position detecting element PSD, and the incident position is detected by a incident position detecting circuit 4. After the incident position detecting circuit 4 detects the incident position of the light beam LA2 by the incident position detecting element PSD, and then the difference from the desired incident position is sent to a drive circuit 5 as a deviation-voltage signal $S_{DET}$.

The drive circuit 5 delivers a drive signal $S_{DRV}$ to an actuator 6 based on the deviation-voltage signal $S_{DET}$ so that the actuator 6 is driven, and thus the lens L2 is driven, and the incident position of the light beam LA2 is servo-controlled.

Similarly as shown in FIG. 2, the drive signal $S_{DRV}$ outputted from the drive circuit 5 is supplied to a motor M1 to turn a mirror barrel 2 up and down or right and left. Thus, the mirror barrel 2 is worked through a worm gear G1 fixed to the output axis of the motor M1 and a gear G2 set up on the mirror barrel 2. Therefore, the mirror barrel 2 is servo-controlled to turn up and down or right and left so that the incident position of the light beam LA2 can be controlled.

In the apparatus of FIG. 1, the path of the internal optical system is automatically shifted to the large-aperture lens L3 so as to match the path of light beam LA1 with the path of light beam LA2 in the atmospheric linking line. In this manner, because a small lens in the optical system is moved, the follow-up performance is comparatively high. However, the angle requirement (and the aberration) for the field of the optical system (the large-aperture lens L3) becomes greater, and there are problems of complexity of construction, for instance, by increasing of the number of the lenses.

Moreover, because the turning power of the motor M1 is transmitted to the mirror barrel 2 by a worm gear G1 and a gear G2, when the light axis of the optical atmospheric link system 1 is changed by disturbance, the changed must be corrected and servo-control in a short time is difficult.

SUMMARY OF THE INVENTION

In view of the foregoing, an object of this invention is to provide an optical atmospheric link system, which enables servo-controlling of the light path with increasingly simple construction, in a short time, and moreover, with smaller driving power.

The foregoing object and other objects of the invention have been achieved by the provision of an optical atmospheric link system 30, according to the first aspect of this invention, which controls the angle of the light beam to be radiated to a predetermined direction comprising: a rigid body for storing at least, the light source and the optical system for emitting the light beam emitted from the light source to an atmospheric linking line: and a rotating means for the housing for supporting and freely rotating the rigid body along two independent axes in the plane perpendicular to the light beam, so that the turning force to rotate the rigid body is applied to the rigid body with no contact.

Further, according to the second aspect of this invention, the rotating means is composed of a linear motor.

Furthermore, according to the third aspect of this invention, the optical atmospheric link system which controls the angle of the light beam radiated to a predetermined direction comprises: rotating means for turning a rigid body, which at least stores the light source and optical system radiating the light beam emitted from the light source, in a direction that controls the angle of the light beam; and a current drive circuit for providing a current, which is proportional to the detected result of an angle detecting optical part and supplies this current to the rotating means.

Furthermore, according to the fourth aspect of this invention, the optical atmospheric link system which controls the angle of the light beam radiated to a predetermined direction comprises: a rotating means for rotating the rigid body, which at least stores the light source and the optical system radiating the light beam emitted from the light source to the optical atmospheric linking line, in a direction that controls the angle of the light beam; and impressment means for impressing, to the rotating means, the sum of the voltages, which are the induced electromotive voltage generated in the rotating means and the voltage proportional to the detected result of the angle detecting optical part detecting the angle.

By transmitting the turning force with no contact, when the rigid body storing the optical system is rotated, the change of the light axis of the rigid body due to disturbances can be compressed. Therefore, the adjustment of the light axis can be servo-controlled with high-speed, and at the same time, the light axis can be adjusted with smaller driving force.

According to this invention, the angle of field of optical system (i.e. of lens) does not restrict the correction range of the light beam angle deviation, which is therefore greater than ±1[°]. As a result, the restriction of the operating environment of the optical atmospheric link system (the quality sway angle) can be reduced.

Further, the requirement for the angle of field can be lowered to enable simplification of the optical system.

Furthermore, because of the compression effect of the sway angle obtained by a slipping, the control amount may be smaller than in a case of comparison with a system using a geared motor or otherwise not having a slipping mechanism. As a result, power consumption can be reduced.

Furthermore, the number of parts composing the optical system can be minimized to the number needed for emitting and receiving the light beam, and loss due to the internal optical system is reduced thus improving the system power margin.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 2:
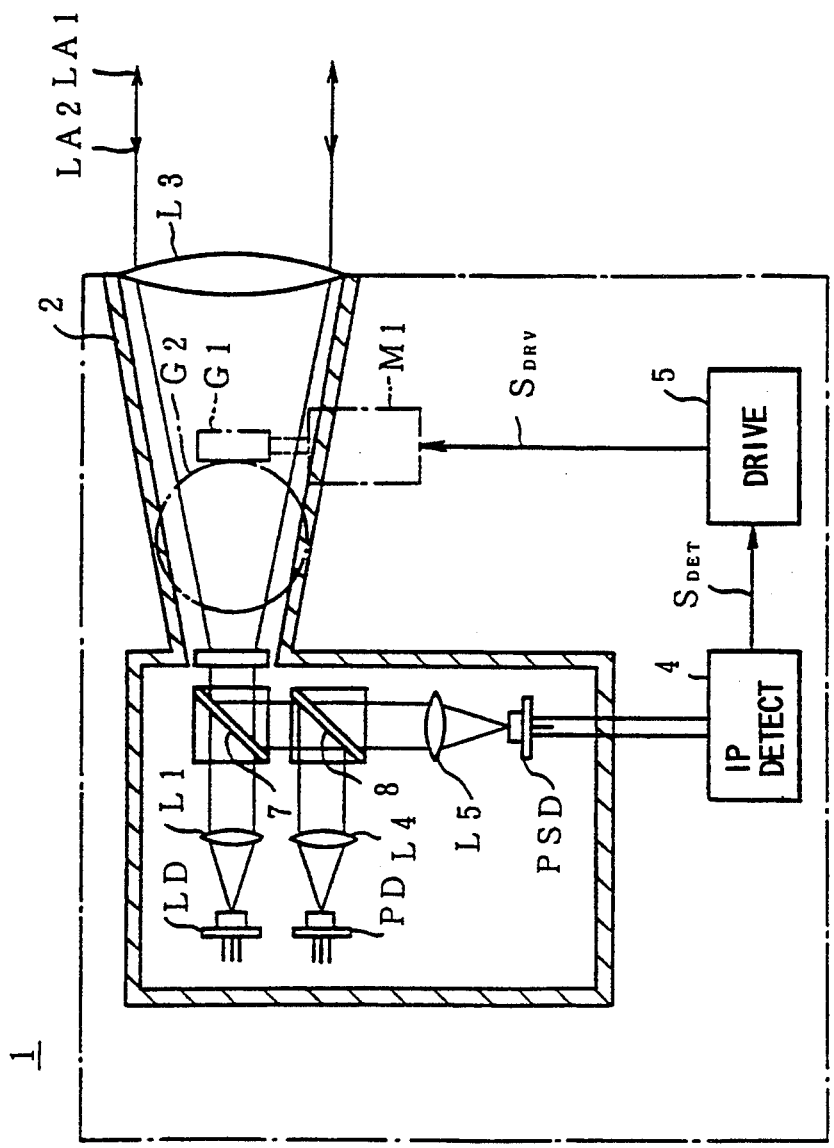
FIG. 2 is a schematic view showing a conventional optical atmospheric link system.
Figure 3:
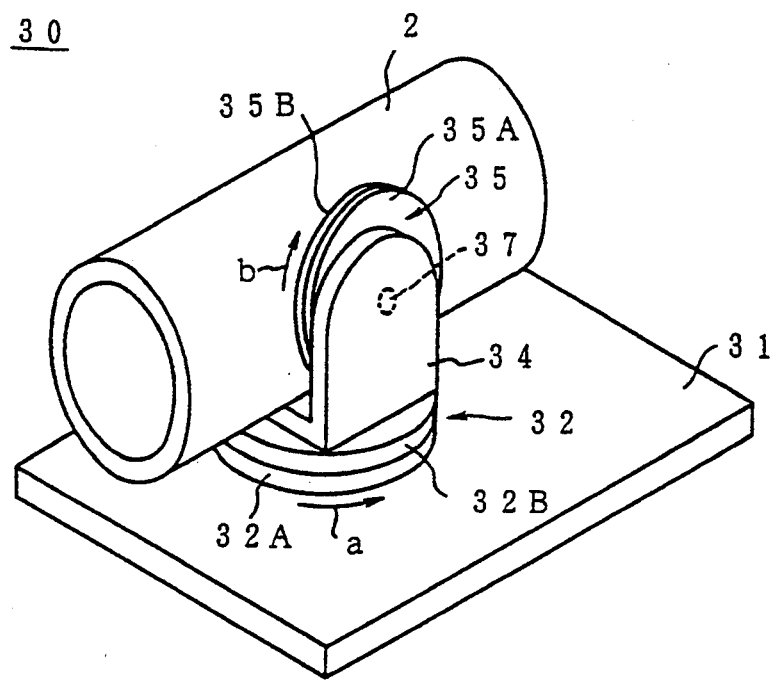
FIG. 3 is a perspective view illustrating one embodiment of the optical atmospheric link system according to the present invention.

Preferred embodiments of this invention will be described with reference to the accompanying drawings:

Referring to FIG. 3, wherein the portions corresponding to those in FIG. 2 are marked with the same numerals and characters, in the optical atmospheric link system 30, the mirror barrel 2 includes inner drive circuit 5 outputting the drive signal $S_{DRV}$ to drive the linear motors 32 and 35, in response to the detected result of the optical system and the incident position detecting means PSD and 4, as described above in FIG. 2, and is supported on the supporting table 31.

That is, a stator part 32A is fixed on the supporting table 31, and a supporting part 34 is fixed at a rotor part 32B of the linear motor 32.

Hence, the linear motor 32 is driven to rotate the supporting part 34 in the direction of arrow "a" or in the opposite direction around a vertical axis.

Further, the stator part 35A of the linear motor 35 is fixed to the supporting part 34, and mirror barrel 2 is fixed to the rotor part 35B of the linear motor 35.

Hence, the linear motor 35 is driven to turn the mirror barrel 2 in the direction shown with arrow "b" or to the opposite direction around a horizontal axis 37. This rotating axis is orthogonal to the optical system of the mirror barrel 2.

Thus, the optical system is constructed to obtain a gimbal movement against the supporting table 31.

Figure 4:
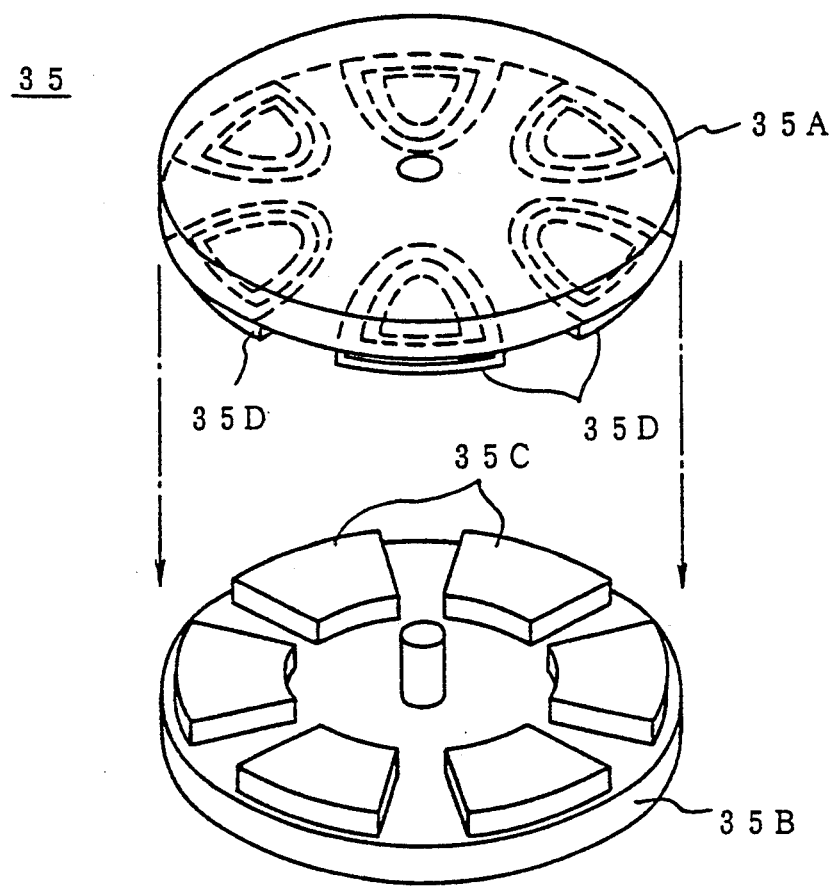
FIG. 4 is a schematic perspective view illustrating a construction of a linear motor for driving a mirror barrel.

The construction of the linear motor 35 is shown in FIG. 4. A plurality of magnets 35C are fixed to the rotor part 35B in a circle in the linear motor 35, and the coils 35D of the stator part 35A are set facing the magnets 35C.

Figure 5:
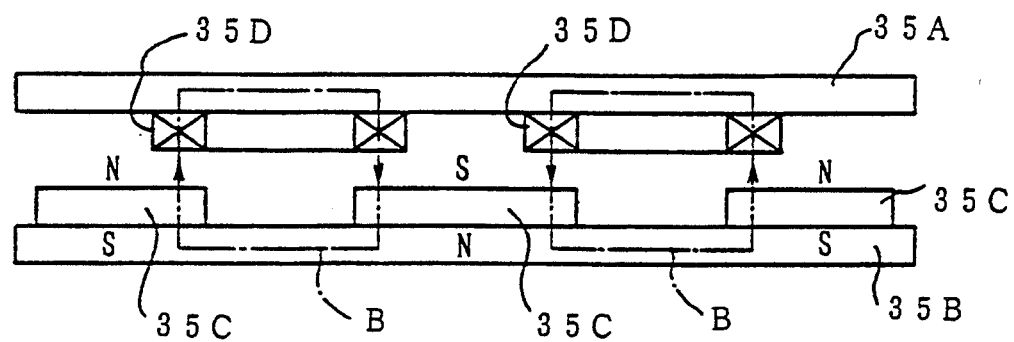
FIG. 5 is a sectional view for explanation of a driving principle of the linear motor.

Accordingly, as shown in FIG. 5, by turning on the drive current to the coil 35D of the stator part 35A, a drive current flows in the direction crossing the magnetic field B so as to rotate the rotor part 35B.

The linear motor 32 also comprises the same construction. Thus, by driving the linear motors 32 and 35, the paths of light beams LA1 and LA2 in the optical atmospheric link system 30 can be freely varied in three dimension.

Figure 1:
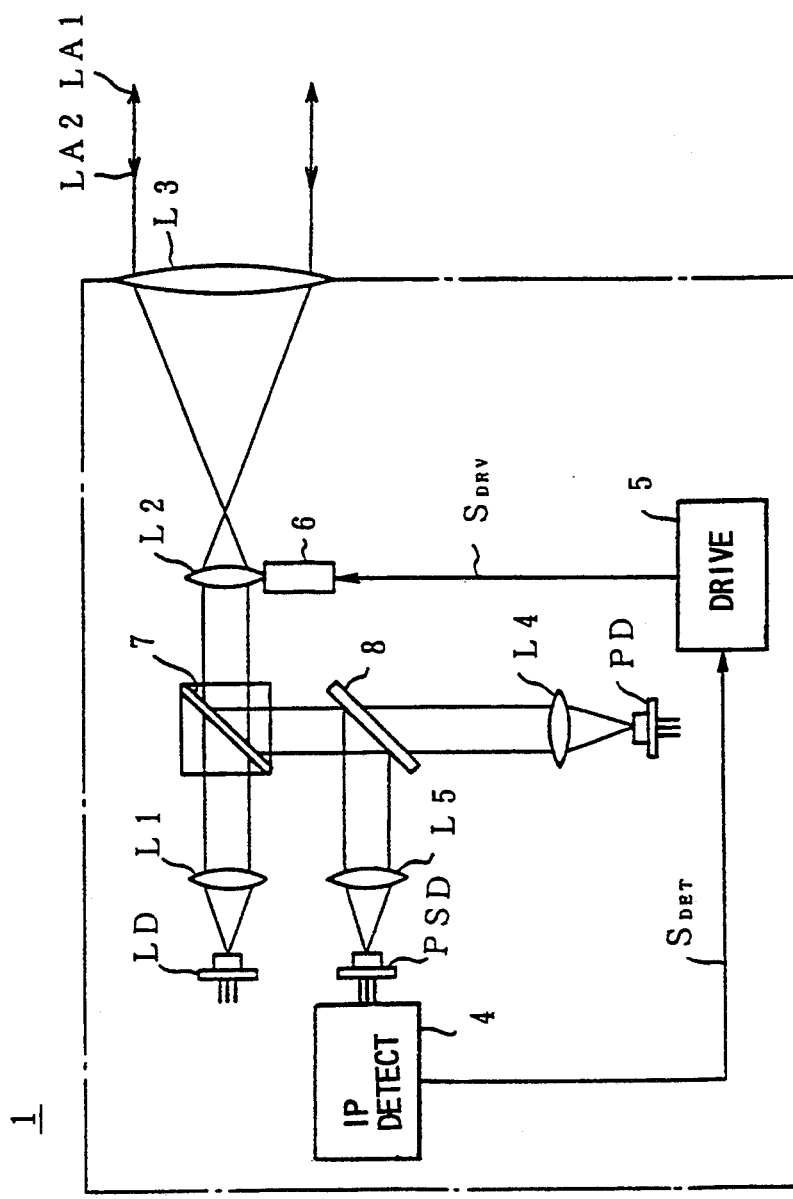
FIG. 1 is a schematic view showing a conventional optical atmospheric link system.

In this way, the mirror barrel 2 is driven based on the deviation voltage signal $S_{DET}$ obtained in the incident position detecting element PSD (FIGS. 1 and 2) of the optical atmospheric link system 30 so that the incident position of the light beam LA2 radiating to the incident position detecting element PSD is adjusted to the desired position. That is, the position enabling emission and reception the light beam to and from the remote target to be transmitted.

In this construction, the two axes of rotation of the linear motor are aligned with the axes balancing with the optical system, which are the axes passing through the center of gravity of the optical system, so that the parallel movement component of the disturbance is not transformed into the rotation component of the optical system.

In the case of optical atmospheric linking, the rotation component causes most of the light beam deviation. Therefore, only the rotation component of disturbance, in which the axis aligning the optical axis of the optical system among the three orthogonal axes of rotation is negligible, is compressed.

In the linear motors 32 and 35, the rotors 32B and 35B and the stator parts 32A and 35A are connected by a bearing 35E to slide very smoothly. When rotary angular acceleration is generated by disturbance on the supporting table, the linear motor slips if the value exceeds a threshold value. Then, the acceleration to the rotor side, which is the optical system side, is extremely reduced. Here, it can be considered that the stator side is fixed to the supporting table 31 together with the linear motors 32 and 35, and the rotor side is fixed to the optical system.

The direction of the radiated light beam LA1 of the optical system does not change even when rotary angular acceleration is applied to the supporting table 31, so that the optical system may stand still with respect to the rotating direction. Therefore, when the angle is corrected by the electromagnetic force of the linear motors 32 and 35, the optical system stands still.

If the linear motors 32 and 35 slip, because the optical system stands still, the slipping contributes to a portion of the angle correction.

Actually, this contribution of the slipping large so that the electromagnetic force and follow-up performance required for the linear motor becomes substantially lower than when there is no slipping, such as when the system is driven by gears, and thus a lower powered linear motor can be used.

Figure 6:
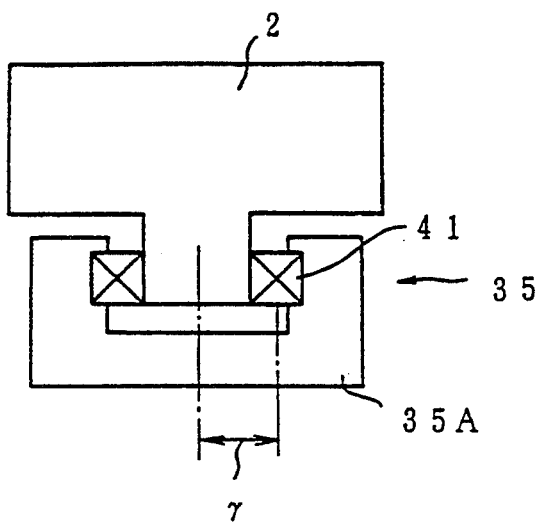
FIG. 6 is a schematic view showing the connection between the linear motor and the mirror barrel.

FIG. 6 is a model of the linear motor for the explanation of the disturbance compression ratio of the angle correction control effect due to the above described slipping.

When the stator is rotated with an angular acceleration $a_w$, the torque $T_1$ generated on the rotor is represented by the following equation:

$$T_1 = mg\mu r \qquad (1)$$

In this equation, "m" represents the mass of the optical system fixed to the rotor, "g" represents the gravitational acceleration, "$\mu$" represents the friction coefficient between the inner and outer of the bearing, and "r" represents the distance between the rotary center and the center of the bearing ball.

Further, the inertial force $T_2$ is represented by the following equation:

$$T_2 = I a_w \qquad (2)$$

In this equation, "I" represents the moment of inertial of the optical system fixed to the rotor as determined by the mass and shape thereof, and "$a_w$" represents the angular acceleration.

When the angular acceleration $T_1 < T_2$, the rotor moves together with the stator so as to move with an acceleration of $a_w$ without slipping.

In the case of a disturbance having an angular acceleration with $T_1 > T_2$, the rotor slips to move with an acceleration of $a_r$ a represented by the following equation:

$$a_r = \frac{T_1}{I} \qquad (3)$$

The disturbance compression ratio n in this case is represented by the following equation:

$$\eta = \frac{a_r}{a_w} \qquad (4)$$

Substituting concrete numbers, the value of compression ratio n will be obtained. That is, m=1[kg], I=0.005[kgm], g=9.8[m/sec$^2$], $\mu$=0.0013, r=0.0125[m] result in the following:

$$T_1 = mg\mu r = 0.00016 \qquad (5)$$

At this time, the acceleration $a_r$ becomes as follows:

$$a_r = 0.032 \ [m/sec^2] \qquad (6)$$

Further, when the disturbance has an angular amplitude of $\pm 1[°]$ and is of a sine wave of 1[Hz] in frequency, the maximum angular acceleration $a_{wmax}$ becomes the following:

$$a_{wmax} = 0.689 \ [rad/sec^2] \qquad (7)$$

The inertial force $T_2$ in the rotor side becomes as shown in the following equation:

$$T^2 = I a_w = 0.0034 \ [Kgm^2/sec] \qquad (8)$$

In this equation, the compression ratio $\eta$ becomes as follows:

$$\eta 0.032/0.689 = 0.046 \ (26 \ dB) \qquad (9)$$

Therefore, an extremely high effect of compression is obtained.

When the diameter of the large aperture lens is 10[cm] and the beam diameter at a 1 [km] in distance is 40 [cm], the angle difference requirement of the optical system is within 0.01 [°]. Therefore, in the case of a disturbance of $\pm 1[°]$ and 1 [Hz], the compression ratio required becomes 40 [dB]. The slip compresses it by 26 [dB] so that the compression ratio required to the control system is only 13 [dB], enough to be actualized in the optical system having the above inertia. The compression due to slipping increases at 12 [dB/Oct] for the frequency of disturbance so that the frequency characteristic of compression required to the control system can be actualized.

The compression ratio is proportional to "r" and "$\mu$", and is inversely proportional to the angular momentum, the square of the frequency, and the inertia "I", within the range that slipping occurs. Therefore, it is favorable for the compression ratio that "r" and "$\mu$" are made as small as possible and "I" is made large. But if "I" is made large, more electromagnetic force is needed in controlling the linear motor. Moreover, the follow-up performance worsens.

Besides, when the frequency is 1 [Hz], the angular amplitude generating the slip is $\pm 0.046$ [°].

The disturbance compression effect due to slip has been described above. However, induced electromotive voltage is generated by the movement of the coil in the linear motors 32 and 35. And when a current caused by the induced electromotive voltage flows, the propulsive power $F_b$ is generated between the rotor and stator. Thus, not only torque $T_1$ is generated by slipping but also propulsive power is applied to the rotor, and as a result, the compression ratio worsens. In the case when the coil is opened, for instance, the current does not flow even when the induced electromotive voltage is generated, therefore no propulsive power is generated.

Figure 7:
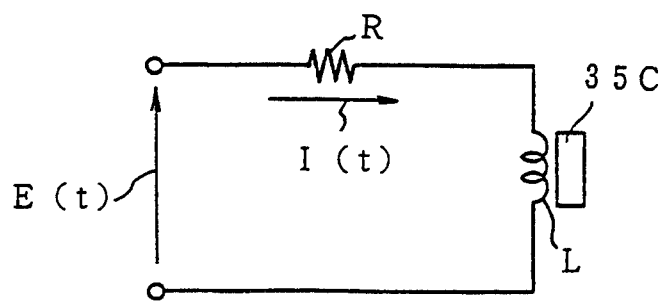
FIG. 7 is a connection diagram showing the equivalent circuit for driving a linear motor.

FIG. 7 shows the equivalent circuit of a coil and the current to voltage equation of a coil is as follows:

$$L \frac{dI(t)}{dt} = E(t) - nBlv(t) \qquad (10)$$

In this equation, "L" represents the inductance of the coil, "I(t)" represents the current through the coil, "E(t)" represents the input voltage of the coil, "n" represents the coil turn number, "B" represents the flux density, "l" represents the length of the coil in a magnetic field, and "v(t)" represents the speed between the rotor and the stator, whereby, the current running through the coil "I(t)" is determined by the equation (10), and the propulsive power F working to the coil, in accordance with Fleming's rule, is represented by the following equation:

$$F = nBlI(t) \qquad (11)$$

When controlling, if it is voltage driven, that is, a voltage proportional to the deviation is provided to the coil, the current being proportional to the control deviation and the current caused by the induced electromotive voltage flow, the voltage running to the coil, as shown in equation (10), worsens the control characteristic.

In the present method, a current drive circuit is prepared just before the coil, and by flowing through the coil a current proportional to the control deviation, the generation of current caused by the induced electromotive voltage is restrained, and the worsening of the control characteristic is prevented. In this case, even when induced electromotive voltage is generated, the current running through the coil does not change.

Further, the voltage applied to the coil is as shown in the following:

$$E(t) = \beta x(t) + nBlv(t) \qquad (12)$$

If this equation (12) is substituted to the equation (10), the effect due to the induced electromotive voltage from the current running through the coil is canceled.

"v(t)" must be known in order to generate the voltage as shown in the equation (12), however, a speed sensor for detecting the speed between the rotor and the stator may be set. Or, angular speed sensors may respectively be set to the rotor and stator, and the difference of the two angular velocity may be taken.

With the above embodiment of in the optical atmospheric link system 30, as compared with the conventional method of driving by gears, the mirror barrel 2 is turned directly by the linear motors 32 and 35 so as to reduce the movement of the mirror barrel 2 when disturbance is applied.

Therefore, the servo-control against disturbances can be decreased, and this enables easier aligning of the optical axis of the optical atmospheric link system 30.

Note that the embodiment described above has dealt with the case where linear motors 32 and 35 are used as the rotating means for turning the mirror barrel 2. However, the present invention is not limited to this, but other motors having variable constitutions may be applied widely.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. In an optical atmospheric link system for transmitting and receiving light beams carrying information signals between transmitter means and receiver means, the receiver means being located apart from the transmitter means, said transmitter means comprising:

light source means for generating a light beam modulated by an information signal;

optical system means for transmitting said light beam along a light path directed from said light source means towards said receiver means;

housing means for holding at least said light source means and said optical system means;

a support member for supporting said rigid housing means;

a base member for supporting said support member; and rotating means attached to said base member for rotating said housing means about two axes, at least one of the axes being perpendicular to said light path, said rotating means including linear motor means comprised of first and second motor means, said first motor means having first rotor means and having first stator means for magnetically driving said first rotor means, at least one of said first rotor and stator means being directly coupled to said housing means and the other of said first rotor and stator means being directly coupled to said support member, said second motor means having second rotor means and having second stator means for magnetically driving said second rotor means, at least one of said second rotor and stator means being directly coupled to said support means and the other of said second rotor and stator means being directly coupled to said base member.

2. An optical atmospheric link system according to claim 1, wherein the optical system means has a center of gravity and said axes intersect the center of gravity of said optical system means.

3. An optical atmospheric link system according to claim 1, wherein said linear motor means further includes sensing means for sensing relative velocity between said first stator means and said first rotor means, and between said second stator means and said second rotor means.

4. An optical atmospheric link system according to claim 1, wherein said linear motor means slips when said motor means accelerates beyond a predetermined value, thereby restricting the acceleration of the rotation of said housing means.

5. A light beam transmitting apparatus for transmitting a light beam carrying information signals towards a light beam receiving apparatus, said apparatus comprising:

light source means for generating a light beam modulated by an information signal;

optical system means for transmitting said light beam along a light path directed from said light source means towards said receiving apparatus;

housing means for holding at least said light source means and said optical system means;

a support member for supporting said housing means;

a base member for supporting said support member;

rotating means attached to said base member for rotating said housing means in response to a control signal, said rotating means including linear motor means, said linear motor means being comprised of first and second motor means, said first motor means having first rotor means and having first stator means for magnetically driving said first rotor means, at least one of said first rotor and stator means being directly coupled to said housing means and the other of said first rotor and stator means being directly coupled to said support member, said second motor means having second rotor means and having second stator means for magnetically driving said second rotor means, at least one of said second rotor and stator means being directly coupled to said support means and the other of said second rotor and stator means being directly coupled to said base member;

detecting means for determining the deviation of said light beam from a predetermined direction and for outputting said control signal, said control signal being indicative of said deviation; and supply means for supplying said control signal to said rotating means.

6. A light beam transmitting apparatus according to claim 5, wherein said supply means supplies to said rotating means a voltage comprising the sum of a voltage proportional to the magnitude of said control signal and of a back electromotive voltage generated in the linear motor means by the rotation of said rotating means.

7. A light beam transmitting apparatus according to claim 5, wherein said linear motor means further includes sensing means for sensing relative velocity between said first stator means and said first rotor means, and between said second stator means and said second rotor means.

8. A light beam transmitting apparatus according to claim 5, wherein said linear motor means slips when said motor means accelerates beyond a predetermined value, thereby restricting the acceleration of the rotation of said housing means.

* * * * *